(12) United States Patent
Zabel et al.

(10) Patent No.: US 12,111,840 B2
(45) Date of Patent: Oct. 8, 2024

(54) METHODS, APPARATUSES, AND SYSTEMS FOR DATA MAPPING

(71) Applicant: Honeywell International Inc., Morris Plains, NJ (US)

(72) Inventors: Shawn Robert Zabel, Fort Mill, SC (US); Siva Rapolu, Hyderabad (IN); Neeraja Sanjeev Arcot, Hyderabad (IN); Swetha Siddalingappa, Hyderabad (IN); Mehabube Rabbanee Shaik, Hyderabad (IN); Charlotte Earle Loomis, La Jolla, CA (US); Jesse Gately, Charlotte, NC (US); Robert Maynard Ghent, Chula Vista, CA (US); Vinatha Babyprakash, Maidenhead (GB); Vojtech Sojka, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 166 days.

(21) Appl. No.: 16/660,122

(22) Filed: Oct. 22, 2019

(65) Prior Publication Data

US 2021/0117436 A1  Apr. 22, 2021

(51) Int. Cl.
*G06F 16/00* (2019.01)
*G06F 16/22* (2019.01)
(Continued)

(52) U.S. Cl.
CPC ........ *G06F 16/258* (2019.01); *G06F 16/2282* (2019.01); *G06F 16/2423* (2019.01); *G06F 16/285* (2019.01); *G06F 17/156* (2013.01)

(58) Field of Classification Search
CPC .. G06F 16/258; G06F 17/156; G06F 16/2282; G06F 16/285; G06F 16/2423
(Continued)

(56) References Cited

U.S. PATENT DOCUMENTS

| 7,962,497 B2* | 6/2011 | Albahari ............... G06F 8/24 |
| | | 707/756 |
| 2006/0215448 A1 | 9/2006 | Ellis et al. |

(Continued)

FOREIGN PATENT DOCUMENTS

| CN | 1841379 A | 10/2006 |
| EP | 2629210 A1 | 8/2013 |

(Continued)

OTHER PUBLICATIONS

AU Notice of Allowance Mailed on Mar. 5, 2024 for AU Application No. 2022204687, 3 page(s).
(Continued)

*Primary Examiner* — Irete F Ehichioya
*Assistant Examiner* — Shirley D Hicks
(74) *Attorney, Agent, or Firm* — Alston & Bird LLP

(57) ABSTRACT

Methods, apparatuses, and systems for improving data mapping are provided. An example method may include retrieving a first plurality of data objects associated with a first database schema from a database, determining a first data classifier corresponding to the first database schema, generating a mapping specification based at least in part on the first data classifier and the first plurality of data objects, and generating a second plurality of data objects based at least in part on the first plurality of data objects and the mapping specification.

20 Claims, 6 Drawing Sheets

(51) Int. Cl.
  *G06F 16/242* (2019.01)
  *G06F 16/25* (2019.01)
  *G06F 16/28* (2019.01)
  *G06F 17/15* (2006.01)

(58) Field of Classification Search
  USPC .................................................. 707/600–899
  See application file for complete search history.

(56) References Cited

U.S. PATENT DOCUMENTS

| | | | |
|---|---|---|---|
| 2008/0222121 | A1 | 9/2008 | Wiessler et al. |
| 2010/0145902 | A1* | 6/2010 | Boyan .................. G06F 16/958 706/54 |
| 2017/0091692 | A1* | 3/2017 | Guo ........................ G06N 5/003 |
| 2018/0025039 | A1 | 1/2018 | Batra et al. |
| 2018/0232528 | A1* | 8/2018 | Williamson ........... G06N 5/025 |
| 2019/0050445 | A1* | 2/2019 | Griffith .................. G06F 16/27 |
| 2019/0220449 | A1 | 7/2019 | Suehs et al. |
| 2019/0258942 | A1 | 8/2019 | Gu et al. |
| 2020/0073865 | A1* | 3/2020 | Jacob .................. G06F 16/2465 |

FOREIGN PATENT DOCUMENTS

| | | |
|---|---|---|
| JP | 2019-528491 A | 10/2019 |
| WO | 2007/143198 A2 | 12/2007 |
| WO | 2018/039245 A1 | 3/2018 |

OTHER PUBLICATIONS

Extended European Search Report issued in European Application No. 20203455.9 on Mar. 15, 2021, 9 pages.
Haslhofer et al. "A survey of techniques for achieving metadata interoperability," ACM Comput Surv, vol. 42, No. 2. Article 7 (2010), 37 pages. DOI:https://doi.org/10.1145/1667062.1667064.
AU Office Action Mailed on Jun. 30, 2021 for AU Application No. 2020257122.
English Translation of JP Office Action Mailed on Jul. 14, 2022 for JP Application No. 2020177565.
English Translation of KR Office Action Mailed on May 20, 2022 for KR Application No. 10-2020-0137265.
IN Office Action Mailed on Dec. 9, 2021 for IN Application No. 202014046182.
JP Office Action Mailed on Jul. 14, 2022 for JP Application No. 2020177565.
KR Office Action Mailed on May 20, 2022 for KR Application No. 10-2020-0137265.
Office Action issued in Japanese Application No. 2020-177565 issued on 2020-177565 on Sep. 29, 2021, 9 pages.
English Translation of KR Office Action Mailed on Dec. 15, 2022 for KR Application No. 10-2020-0137265.
KR Office Action Mailed on Dec. 15, 2022 for KR Application No. 10-2020-0137265.
AU Office Action Mailed on Jun. 29, 2022 for AU Application No. 2020257122, 4 page(s).
AU Office Action Mailed on Mar. 23, 2023 for AU Application No. 2022204687, 2 page(s).
English translation of JP Decision to Grant Mailed on Feb. 2, 2023 for JP Application No. 2020177565, 2 page(s).
English translation of JP Search report Mailed on Aug. 31, 2021 for JP Application No. 2020177565, 9 page(s).
European search opinion Mailed on Mar. 15, 2021 for EP Application No. 20203455, 4 page(s).
JP Decision to Grant Mailed on Feb. 2, 2023 for JP Application No. 2020177565, 3 page(s).
JP Search report Mailed on Aug. 31, 2021 for JP Application No. 2020177565, 8 page(s).
CN Office Action Mailed on May 29, 2024 for CN Application No. 202011141759, 7 page(s).
English Translation of CN Office Action dated May 29, 2024 for CN Application No. 202011141759, 14 page(s).
Notification of Oral Proceeding Mailed on Jun. 3, 2024 for EP Application No. 20203455, 8 page(s).

* cited by examiner

METHODS, APPARATUSES, AND SYSTEMS FOR DATA MAPPING

FIELD OF THE INVENTION

The present disclosure relates generally to methods, apparatuses, and systems for data mapping, and more particularly, to methods, apparatuses, and systems for generating data classifiers for data mapping.

BACKGROUND

A database is a collection of information or data (such as data objects) that may be stored, accessed, and/or managed electronically by a computing system. A database schema refers to a structure that may define how the data is organized and/or associated with each other in the database. Database may be implemented in a variety of fields, including, but is not limited to, healthcare industry, retail industry, and financial services.

Many systems and methods do not overcome technical challenges and difficulties associated with databases. For example, data may be stored in a legacy database that may not be in compliance with a common data model, and many systems and methods do not provide the capability to convert these data so that they can be analyzed by a computing system. These challenges and difficulties may be further amplified when legacy databases store a large quantity of data that need to be analyzed.

BRIEF SUMMARY

In accordance with various examples, an apparatus may be provided. The apparatus may comprise at least one processor and at least one non-transitory memory comprising program code. The at least one non-transitory memory and the program code may be configured to, with the at least one processor, cause the apparatus to at least: retrieve a first plurality of data objects associated with a first database schema; determine, based at least on the first plurality of data objects, a first data classifier corresponding to the first database schema; generate a mapping specification based at least in part on the first data classifier and the first plurality of data objects; and generate a second plurality of data objects based at least in part on the first plurality of data objects and the mapping specification. In some examples, the mapping specification may be configured to convert the first plurality of data objects associated with the first database schema to a second plurality of data objects associated with a second database schema.

In some examples, the first plurality of data objects may comprise a first data table. In some examples, the first data table may comprise at least one data field. In some examples, the first data table may comprise at least one of name metadata, column metadata, or row metadata.

In some examples, when determining the first data classifier corresponding to the first database schema, the at least one non-transitory memory and the program code may be configured to, with the at least one processor, cause the apparatus to: retrieve at least one of the name metadata, the column metadata, or the row metadata associated with the first plurality of data objects; and determine the first data classifier based further on at least one of the name metadata, the column metadata, or the row metadata.

In some examples, the first plurality of data objects may comprise a second data table. In some examples, the at least one non-transitory memory and the program code may be configured to, with the at least one processor, cause the apparatus to: determine correlation metadata associated with the first data table and the second data table; and determine the first data classifier based further on the correlation metadata.

In some examples, when determining the first data classifier corresponding to the first database schema, the at least one non-transitory memory and the program code may be configured to, with the at least one processor, cause the apparatus to: determine domain metadata associated with the first data table; and determine the first data classifier based further on the domain metadata.

In some examples, prior to generating the mapping specification, the at least one non-transitory memory and the program code may be configured to, with the at least one processor, cause the apparatus to further: calculate a confidence score associated with the first data classifier; and determine whether the confidence score satisfies a predetermined threshold.

In some examples, generating the mapping specification may be in response to determining that the confidence score satisfies the predetermined threshold.

In some examples, the at least one non-transitory memory and the program code may be configured to, with the at least one processor, cause the apparatus to further: determine that the confidence score does not satisfy the predetermined threshold; generate a user input request associated with the first data classifier; and receive a user input in response to the user input request. In some examples, the user input request may comprise an electronic request to confirm the first data classifier.

In some examples, the user input may comprise a confirmation of the first data classifier. In some examples, generating the mapping specification may be in response to the confirmation of the first data classifier.

In some examples, the user input may comprise a modification of the first data classifier, wherein the at least one non-transitory memory and the program code are configured to, with the at least one processor, cause the apparatus to further: modify the first data classifier based on the user input.

In some examples, the at least one non-transitory memory and the program code may be configured to, with the at least one processor, cause the apparatus to further: generate feedback data based on the user input; retrieve a third plurality of data objects associated with a third database schema; and determine, based at least on the third plurality of data objects and the feedback data, a second data classifier corresponding to the third database schema.

In accordance with various examples, a computer-implemented method may be provided. The computer-implemented method may comprise: retrieving a first plurality of data objects associated with a first database schema from a database; determining, based at least on the first plurality of data objects, a first data classifier corresponding to the first database schema; generating a mapping specification based at least in part on the first data classifier and the first plurality of data objects; and generating the second plurality of data objects based at least in part on the first plurality of data objects and the mapping specification. In some examples, the mapping specification may be configured to convert the first plurality of data objects associated with the first database schema to a second plurality of data objects associated with a second database schema.

In accordance with various examples, a computer program product may be provided. The computer program product may comprise at least one non-transitory computer-readable storage medium having computer-readable program code portions stored therein. The computer-readable program code portions may comprise an executable portion that is configured to: retrieve a first plurality of data objects associated with a first database schema from a database; determine, based at least on the first plurality of data objects, a first data classifier corresponding to the first database schema; generate a mapping specification based at least in part on the first data classifier and the first plurality of data objects; and generate the second plurality of data objects based at least in part on the first plurality of data objects and the mapping specification. In some examples, the mapping specification may be configured to convert the first plurality of data objects associated with the first database schema to a second plurality of data objects associated with a second database schema.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
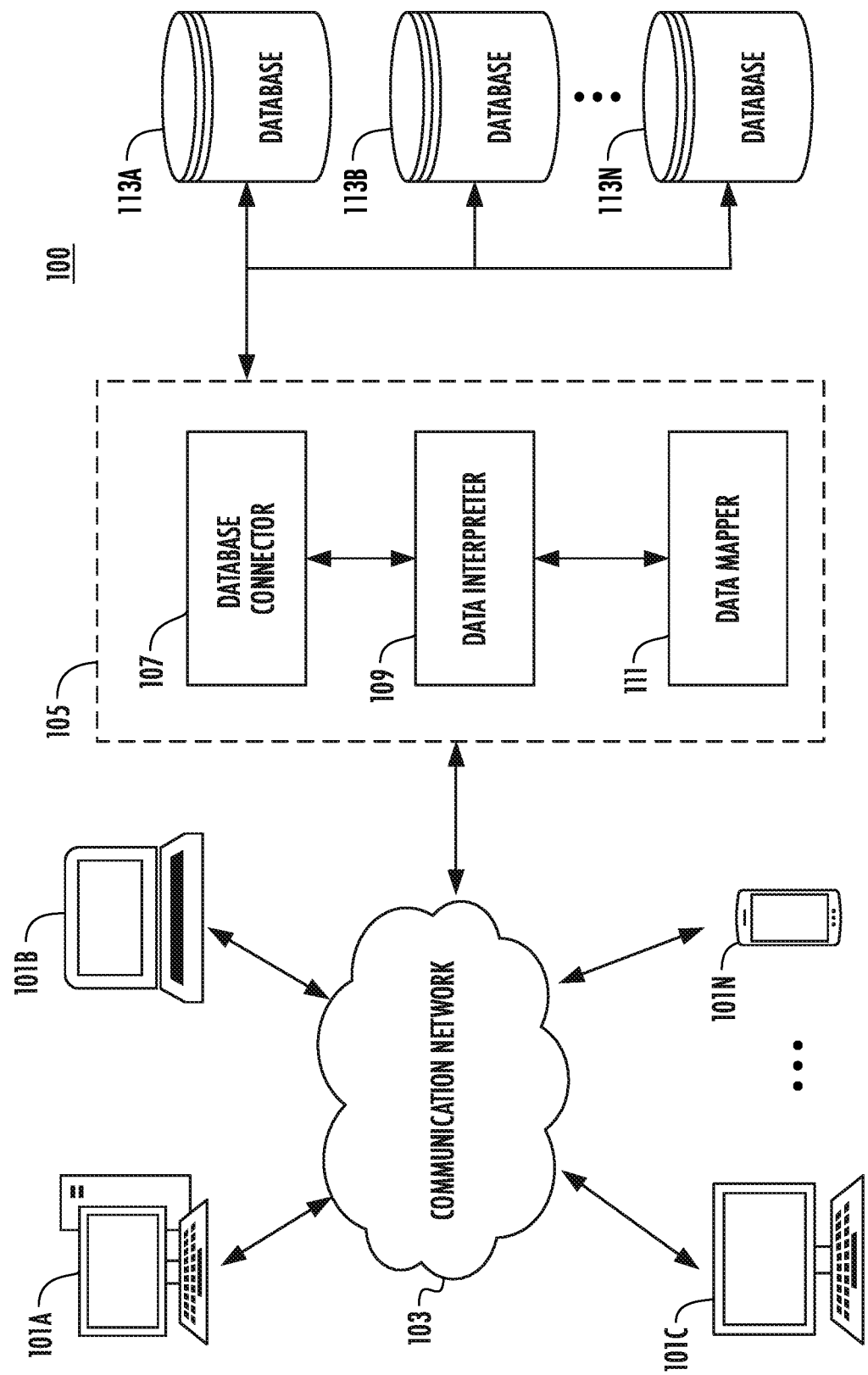
FIG. 1 illustrates an example schematic diagram of an example system in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The phrases "in one embodiment," "according to one embodiment," "for example," "in some examples," "as an example," and the like generally mean that the particular feature, structure, or characteristic following the phrase may be included in at least one embodiment of the present disclosure, and may be included in more than one embodiment of the present disclosure (such phrases do not necessarily refer to the same embodiment).

The word "example" or "exemplary" is used herein to mean "serving as an example, instance, or illustration." Any implementation described herein as "example" or "exemplary" is not necessarily to be construed as preferred or advantageous over other implementations.

If the specification states a component or feature "may," "can," "could," "should," "would," "preferably," "possibly," "typically," "optionally," "for example," "in some examples," "often," or "might" (or other such language) be included or have a characteristic, that a specific component or feature is not required to be included or to have the characteristic. Such component or feature may be optionally included in some embodiments, or it may be excluded.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "electronically coupled," "electronically coupling," "electronically couple," "in communication with," "in electronic communication with," or "connected" in the present disclosure refers to two or more components (for example but not limited to, client device(s), data analytics system(s), database(s)) being connected through wired means (for example but not limited to, wired Ethernet) and/or wireless means (for example but not limited to, Wi-Fi, Bluetooth, ZigBee), such that data and/or information may be transmitted to and/or received from these components.

The term "data analytics system" may refer to a system or virtual environment that may be configured to generate data classifiers that may indicate the meaning of data stored in a database, and/or generate mapping specifications based on data classifiers. The data analytics system may take the form of one or more central servers disposed in communication with one or more additional servers running software applications and having access to one or more databases storing digital content items, application-related data, and/or the like. An example data analytics system is described at least in connection with FIG. 1 herein.

The term "user" should be understood to refer to an individual, group of individuals, business, organization, and the like. The users referred to herein may access a data analytics system using client devices. The term "client device" refers to computer hardware and/or software that is configured to access the data analytics system. Client devices may include, without limitation, smart phones, tablet computers, laptop computers, wearables, personal computers, enterprise computers, and the like.

In some examples, data and information (such as electronic requests) may be transmitted to and/or received from a data analytics system. For example, a "data classification request" may indicate an electronic request to generate a data classifier, which may indicate the meaning of data stored in a database. In some examples, data classification requests may be transmitted to a data analytics system from a client device. As another example, a "user input request" may indicate an electronic request to provide a user input. In some examples, a user input request may be transmitted to a client device from a data analytics system, and may comprise an electronic request to confirm a data classifier, details of which are described herein.

The term "data object" refers to a data structure that may represent one or more values associated with data. A data object may be stored in a database, and may comprise one or more "data fields." In some examples, a data field may be in the form of an American Standard Code for Information Interchange (ASCII) text, a pointer, a memory address, and the like, and may comprise at least one value associated with a data object.

For example, a data object may comprise a "data table," which may represent values in a tabular or semi-tabular form that may include row(s) and/or column(s). In some examples, a data table may comprise at least one data field. Example data fields in an example data table is illustrated below:

| (Name) | (Column 1) | (Column 2) |
|---|---|---|
| (Row 1) | Data Field 1 | Data Field 2 |
| (Row 2) | Data Field 3 | Data Field 4 |

In the above example, the data table may comprise two rows, two columns, and four data fields (such as Data Field 1, Data Field 2, Data Field 3, and Data Field 4).

In some examples, one or more data fields of a data table may be associated with a row identifier and/or a column identifier. A row identifier may be in the form of an ASCII text, a pointer, a memory address, and the like, and may uniquely identify a row associated with a data field. A column identifier may be in the form of an ASCII text, a pointer, a memory address, and the like, and may uniquely identify a column associated with the data field.

Continuing from the above example, Data Field 1 may be associated with a row identifier Row 1 and a column identifier Column 1. Data Field 2 may be associated with a row identifier Row 1 and a column identifier Column 2. Data Field 3 may be associated with a row identifier Row 2 and a column identifier Column 1. Data Field 4 may be associated with a row identifier Row 2 and a column identifier Column 2.

The term "metadata" refers to data that may describe other data (such as a data field of a data object). In some examples, a data object may comprise and/or be associated with one or more metadata. In some examples, metadata may be in the form of an ASCII text, a pointer, a memory address, and the like, and may comprise information associated with the meaning of values in a data field.

In some examples, a data table may comprise at least one of name metadata, column metadata, and/or row metadata, as shown in the following example:

| Name Metadata 1 | Column Metadata 1 | Column Metadata 2 |
|---|---|---|
| Row Metadata 1 | Data Field 1 | Data Field 2 |
| Row Metadata 2 | Data Field 3 | Data Field 4 |

In the above example, name metadata (such as Name Metadata 1), column metadata (such as Column Metadata 1 and Column Metadata 2), and row metadata (such as Row Metadata 1 and Row Metadata 2) may be associated with the meaning of data fields (such as Data Field 1, Data Field 2, Data Field 3, and Data Field 4) in the data table.

In some examples, the name metadata may be in the form of an ASCII text, a pointer, a memory address, and the like, and may comprise a name of the data table. In some examples, the column metadata may be in the form of an ASCII text, a pointer, a memory address, and the like, and may comprise a column identifier and/or a name of the column. In some examples, the row metadata may be in the form of an ASCII text, a pointer, a memory address, and the like, and may comprise a row identifier and/or a name of the row. In some examples, a data analytics system may implement machine learning models to determine the meaning of data fields based on at least one of the name metadata, the column metadata, and/or the row metadata, details of which are described herein.

While the above example data table illustrates example name metadata, example column metadata, and example row metadata, it is noted that the scope of the present disclosure is not limited to these metadata. For example, a data analytics system may determine "correlation metadata," which may indicate a relationship between two or more data objects. In some examples, a data analytics system may determine "domain metadata," which may indicate a domain associated with a data object. Examples of correlation metadata and domain metadata are described herein.

The term "data object identifier" refers to an identifier that may uniquely identify and/or locate a data object from a plurality of data objects and/or from one or more databases. In some examples, a data object identifier may be in the form of an ASCII text, a memory address, a network address, and the like.

In some examples, data objects stored in a database may be associated with a database schema of the database. As described above, a "database schema" may refer to a structure of a database that may define how data is organized and/or associated with each other in the database. In some examples, a database schema may be a physical implementation of a data model. The term "data model" may refer to an abstract model that may organize data objects and standardize their relationships. Example data model may include (but is not limited to) common data model (CDM), which is a shared data model that may provide a standardized organization of data objects to be shared between applications and/or data sources.

The term "database identifier" refers to an identifier that may uniquely identify and/or locate a database and/or a database schema. In some examples, a data object identifier may be in the form of an ASCII text, a memory address, a network address, and the like.

The term "data classifier" may refer to data that may indicate a classification, comprise a description, and/or provide a meaning of information associated with one or more data objects. A data classifier may be in the form of an ASCII text, a pointer, a memory address, and the like. For example, a data classifier may be in the form of a text string, which may comprise a data category associated with one or more data fields in one or more data objects. Example data categories may include, but are not limited to, user names, email addresses, battery level values, measurements. In some examples, a data classifier may be generated by a data analytics system, example details of which are described herein.

The term "mapping specification" may refer to a data object that may describe and/or specify the movement and/or transformation that may determine how data associated with one data model can be represented based on another data model. For example, a mapping specification may be configured to convert a first plurality of data objects associated with a first database schema to a second plurality of data objects associated with a second database schema. In some examples, a mapping specification may be generated by a data analytics system, example details of which are described herein.

As described above, many systems and methods do not overcome technical challenges and difficulties associated with databases. For example, many systems lack the capability to analyze data stored in a legacy database that may not be in compliance with the latest database model. In some examples, it may be costly to consume these data for the purposes of data analytics when it may not be known what insights can be generated with the data. For example, data stored in a legacy database may comprise strings of numbers, and it may not be known what these strings of numbers may represent. As such, it may incur cost and consume time to understand the data before it can be used for analytics. In some examples, computing resource may be wasted when no useful insights can be generated as a result of understanding the data.

In contrast, various examples in accordance with the present disclosure may overcome these challenges and difficulties. In some examples, a machine-intelligent solution (such as using machine learning and other techniques) may infer the meaning of data in the database by inspecting the name of data, type of data and relationships between data. In some examples, these data may be automatically mapped into a data model for analytics purposes when there is sufficient confidence in the meaning of data. In some examples, when the confidence in the meaning of data is not sufficient, a user may provide a user input on the meaning of data, which may be used to improve the machine-intelligent solution. As such, various examples of the present disclosure may lower the cost and computing resource required for data mapping, and may increase the quality of useful insights from data.

Methods, apparatuses, and computer program products of the present disclosure may be embodied by any of a variety of devices. For example, the method, apparatus, and computer program product of an example embodiment may be embodied by a networked device (e.g., a data analytics system), such as a server or other network entity, configured to communicate with one or more devices, such as one or more client devices. Additionally, or alternatively, the computing device may include fixed computing devices, such as a personal computer or a computer workstation. Additionally, or alternatively, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present disclosure may operate. Users may access a data analytics system 105 via a communication network 103 using client devices 101A, 101B, 101C, . . . 101N.

The client devices 101A-101N may be any computing device as defined above. Electronic data received by the data analytics system 105 from the client devices 101A-101N may be provided in various forms and via various methods. For example, the client devices 101A-101N may include desktop computers, laptop computers, smartphones, netbooks, tablet computers, wearables, and the like. In some examples, one or more of the client devices 101A-101N may each be assigned to a client device identifier that may uniquely identify the client device. In some examples, the client device identifier may comprise an ASCII text, a pointer, a memory address, and the like.

In embodiments where a client device of client devices 101A-101N is a mobile device, such as a smart phone or tablet, the client device may execute an "app" to interact with the data analytics system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via Application Programming Interfaces (APIs) provided by the mobile device operating system. In some examples, the app may provide a user interface that may allow a user to interact with the data analytics system 105.

Additionally, or alternatively, the client devices 101A-101N may interact with the data analytics system 105 via a web browser. Additionally, or alternatively, the client devices 101A-101N may include various hardware or firmware designed to interface with the data analytics system 105.

The communication network 103 may include one or more wired or wireless communication networks including, for example, a wired or wireless local area network (LAN), personal area network (PAN), metropolitan area network (MAN), wide area network (WAN), or the like, as well as any hardware, software and/or firmware required to implement the one or more networks (such as, for example, network routers). For example, the communication network 103 may include General Packet Radio Service (GPRS) network, Code Division Multiple Access 2000 (CDMA2000) network, Wideband Code Division Multiple Access (WCDMA) network, Global System for Mobile Communications (GSM) network, Enhanced Data rates for GSM Evolution (EDGE) network, Time Division-Synchronous Code Division Multiple Access (TD-SCDMA) network, Long Term Evolution (LTE) network, High Speed Packet Access (HSPA) network, High-Speed Downlink Packet Access (HSDPA) network, IEEE 802.11 (Wi-Fi), Wi-Fi Direct, IEEE 802.16 (WiMAX), and/or the like. Additionally, or alternatively, the communication network 103 may include a public network (such as the Internet), a private network (such as an intranet), or combinations thereof.

In some examples, the communication network 103 may utilize networking protocols including, but not limited to, Hypertext Transfer Protocol (HTTP) protocol, one or more Transmission Control Protocol/Internet Protocol (TCP/IP) based networking protocols, Near Field Communication (NFC) protocols, Bluetooth protocols, and/or ZigBee protocols. For instance, the networking protocol may be customized to suit the needs of the data analytics system 105. In some embodiments, the protocol may be a custom protocol of JSON objects sent via a Websocket channel. In some embodiments, the protocol may be JSON over RPC, JSON over REST/HTTP, and the like.

Referring back to FIG. 1, the data analytics system 105 may be embodied as a computing device described above. For example, the data analytics system 105 may comprise at least one processor and at least one non-transitory memory storing computer program instructions. These computer program instructions may direct the data analytics system 105 to function in a particular manner, such that the instructions stored in the at least one non-transitory memory may produce an article of manufacture, the execution of which may implement embodiments of the present disclosure. As such, in some examples of the present disclosure, the data analytics system 105 may comprise a database connector 107, a data interpreter 109, and/or a data mapper 111.

The database connector 107, the data interpreter 109, and/or the data mapper 111 may be embodied in hardware means (such as circuitry or circuitries), software means (such as computer program codes), or a combination of hardware means and software means. In some examples, the database connector 107 may be configured to retrieve one or more data objects from one or more databases (including, but is not limited to, databases 113A-113N as shown in FIG. 1). In some examples, the data interpreter 109 may be configured to generate one or more data classifiers. In some examples, the data mapper 111 may be configured to generate one or more mapping specifications. An example diagram illustrating various example components of the data analytics system 105 is illustrated and described in connection with at least FIG. 2.

It is noted that various components in the data analytics system 105 may leverage the same computer or computing apparatus to perform operations in accordance with examples of the present disclosure. For example, the database connector 107, the data interpreter 109, and/or the data mapper 111 may leverage the same processor or memory to perform these functions. In some examples, the database connector 107, the data interpreter 109, and/or the data mapper 111 may utilize separated circuitries.

In various embodiments of the present disclosure, one or more electronic requests may be sent to the data analytics system 105, including, but not limited to, data classification requests and/or data mapping requests. In some examples, these electronic requests may be in the form of HTTP requests. In some examples, these electronic requests may be sent to the data analytics system 105 over the communication network 103 directly by a client device of client devices 101A-101N. Additionally, or alternatively, the electronic requests may be sent to the data analytics system 105 via an intermediary.

In some examples, upon receiving the data classification requests, the data analytics system 105 may generate one or more data classifiers. In some examples, based on the one or more data classifiers, the data analytics system 105 may generate one or more mapping specifications.

Referring back to FIG. 1, the databases 113A-113N may be embodied as one or more data storage devices such as a Network Attached Storage (NAS) device or devices, or as a separate server or servers. The databases 113A-113N may include data and/or information accessible to the data analytics system 105 and/or the client devices 101A-101N.

In some examples, the databases 113A-113N may store data such as, but is not limited to, one or more data objects. In some examples, upon receiving the data classification requests, the data analytics system 105 may transmit an electronic request to the databases 113A-113N to retrieve or fetch one or more data objects from the databases 113A-113N. In some examples, the data analytics system 105 may store one or more data objects in the databases 113A-113N.

It is noted that the databases 113A-113N may leverage the same computer or computing apparatus to perform the above-described operations. For example, the databases 113A-113N may be integrated within the data analytics system 105, such the databases 113A-113N may be part of the data analytics system 105. In some examples, the databases 113A-113N and the data analytics system 105 may utilize separated circuitries.

Figure 2:
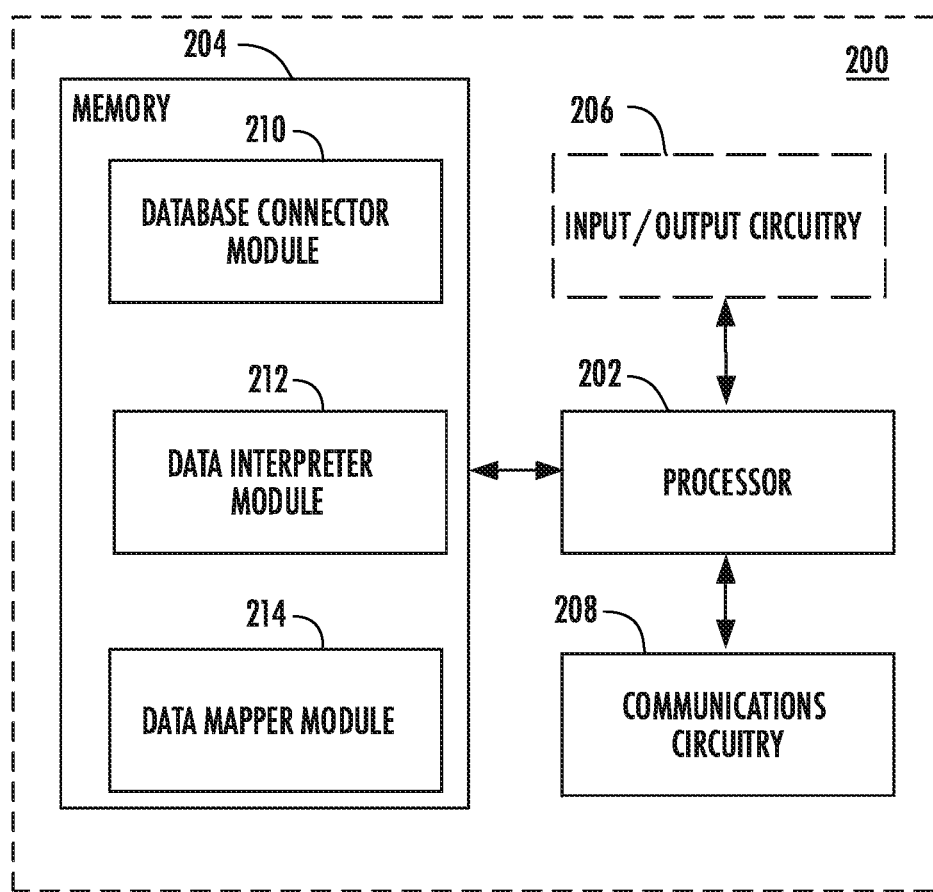
FIG. 2 illustrates an example block diagram of an example apparatus in accordance with various embodiments of the present disclosure.

The data analytics system 105 of FIG. 1 may be embodied by one or more computing systems, such as apparatus 200 as shown in FIG. 2. The apparatus 200 may include a processor 202, a memory 204, an input/output circuitry 206, and/or a communications circuitry 208. The apparatus 200 may be configured to execute the operations described above with respect to FIG. 1 and below with respect to FIGS. 3-7.

Although these components are described with respect to functional limitations, it should be understood that the particular implementations necessarily include the use of particular hardware. It should also be understood that certain of these components may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

In the example as shown in FIG. 2, the memory 204 may store computer program instructions that may comprise a database connector module 210, a data interpreter module 212, and/or a data mapper module 214. When the database connector module 210 is executed by the processor 202, the apparatus 200 may be configured to retrieve one or more data objects from one or more databases (such as, but is not limited to, the databases 113A-113N described above in connection with FIG. 1). When the data interpreter module 212 is executed by the processor 202, the apparatus 200 may be configured to generate one or more data classifiers. When the data mapper module 214 is executed by the processor 202, the apparatus 200 may be configured to generate one or more mapping specifications.

Additionally, or alternatively, the apparatus 200 may include one or more designated hardware configured for the database connector module 210, the data interpreter module 212, and/or the data mapper module 214. For example, the apparatus 200 may include a separate processor, specially configured Field Programmable Gate Array (FPGA), or Application Specific Integrated Circuit (ASIC) that are configured to perform the functions of the database connector module 210, the data interpreter module 212, and/or the data mapper module 214.

Referring back to FIG. 2, the processor 202 may be embodied in a number of different ways and may, for example, include one or more processing devices configured to perform independently. In some examples, the processor 202 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

As described above, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The communications circuitry 208 may be any means such as a device or circuitry embodied in either hardware or a combination of hardware and software that is configured to receive and/or transmit data from/to a network and/or any other device, circuitry, or module in communication with the apparatus 200 (such as the client devices 101A-101N and/or the databases 113A-113N described above in connection with FIG. 1). In this regard, the communications circuitry 208 may include, for example, a network interface for enabling communications with a wired or wireless communication network (such as the communication network 103 described above in connection with FIG. 1). For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

In some examples, the apparatus 200 may optionally include the input/output circuitry 206 that may, in turn, be in communication with the processor 202 to provide output to the user and, in some embodiments, to receive an indication of a user input. The input/output circuitry 206 may comprise a user interface circuitry and may include a display, which may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine may create the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware.

Referring now to FIG. 3 to FIG. 7, example methods in accordance with various embodiments of the present disclosure are illustrated. In some examples, each block or step of the flowchart, and combinations of blocks and/or steps in the flowchart, may be implemented by various means such as hardware, circuitry and/or other devices associated with execution of software including one or more computer program instructions.

In some examples, one or more of the procedures described in the figures may be embodied by computer program instructions, which may be stored by a memory circuitry (such as a non-transitory memory) of an apparatus employing an embodiment of the present disclosure and executed by a processing circuitry (such as a processor) of the apparatus. These computer program instructions may direct the apparatus to function in a particular manner, such that the instructions stored in the memory circuitry may produce an article of manufacture, the execution of which may implement the function specified in the flowchart block(s). Further, the apparatus may comprise one or more other components, such as, for example, a communication circuitry and/or an input/output circuitry. Various components of the apparatus may be in electronic communication between and/or among each other to transmit data to and/or receive data from each other.

In some examples, embodiments may take the form of a computer program product on a non-transitory computer-readable storage medium storing computer-readable program instructions (e.g. computer software). Any suitable computer-readable storage medium may be utilized including non-transitory hard disks, CD-ROMs, flash memory, optical storage devices, and/or magnetic storage devices.

Figure 3:
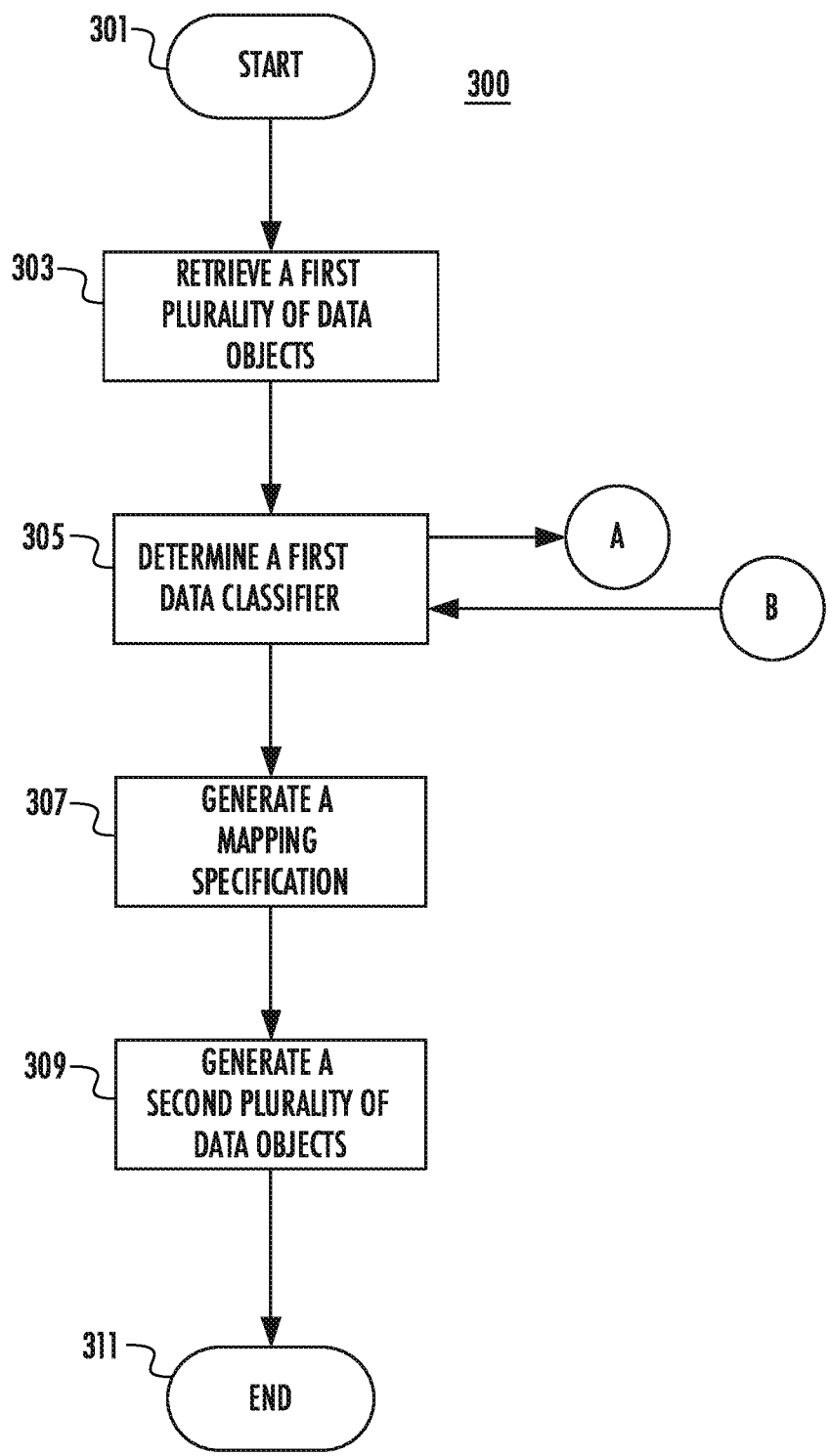
FIG. 3 illustrates an example flow diagram in accordance with various embodiments of the present disclosure.

Referring now to FIG. 3, an example method 300 in accordance with some embodiments of the present disclosure is illustrated. In particular, the example method 300 may illustrate example embodiments of classifying data objects and generating mapping specification for converting data objects. In some examples, the method 300 may be performed by a processing circuitry (for example, a processing circuitry of the data analytics system 105 described in connection with FIG. 1 and/or the processor 202 of the apparatus 200 described in connection with FIG. 2).

The method 300 starts at block 301.

At block 303, a processing circuitry (for example, a processing circuitry of the data analytics system 105 described in connection with FIG. 1 and/or the processor 202 of the apparatus 200 described in connection with FIG. 2) may retrieve a first plurality of data objects. In some examples, the first plurality of data objects may be associated with a first database schema.

In some examples, the processing circuitry may receive a data classification request from a client device (such as, but is not limited to, one of the client devices 101A-101N as shown in FIG. 1). The data classification request may comprise one or more data object identifiers and/or a request to generate a data classifier.

As described above, the data object identifiers may identify and/or locate the data objects from one or more databases (such as, but is not limited to, the databases 113A-113N as shown in FIG. 1). Upon receiving the data classification request, the processing circuitry may transmit a data retrieval request (which may comprise, for example, one or more data object identifiers) to one or more databases (such as, but is not limited to, the databases 113A-113N as shown in FIG. 1). The processing circuitry may receive one or more data objects associated with the data object identifiers from the one or more databases in response to the data retrieval request.

In some examples, the processing circuitry may comprise a database connector component (for example, but is not limited to, the database connector 107 as shown in FIG. 1). The database connector component may fetch the data objects and/or database schema information from one or more databases, and may transmit the data objects and/or database schema information to a data interpreter component (for example, but is not limited to, the data interpreter 109 as shown in FIG. 1).

At block 305, a processing circuitry (for example, a processing circuitry of the data analytics system 105 described in connection with FIG. 1 and/or the processor 202 of the apparatus 200 described in connection with FIG. 2) may determine a first data classifier corresponding to the first database schema. In some examples, the processing circuitry may determine the first data classifier based at least on the first plurality of data objects retrieved at block 303.

In some examples, the processing circuitry may comprise a data interpreter component (for example, but is not limited to, the data interpreter 109 as shown in FIG. 1). The data interpreter component may receive data from a database connector component (for example, but is not limited to, the database connector 107 as shown in FIG. 1).

As described above, the data classifier may be in the form of an ASCII text, a pointer, a memory address, and the like, which may indicate a classification, comprise a description, and/or provide a meaning of information associated with one or more data objects. In some examples, the processing circuitry may apply machine learning models, intelligent agents (IAs) and/or artificial intelligence (AI) tools to determine the data classifier.

In some examples, the processing circuitry may implement an artificial neural network to determine the first data classifier. An example artificial neural network may comprise a plurality of interconnected nodes, and each node may represent a mathematical function that may generate output (to a node) based on input (received from a node). The plurality of nodes may be divided into layers, such as an input layer, one or more intermediate layer, and an output layer.

As an example, the following data object (in the form of a data table) may be provided as input to an example artificial neural network by the processing circuitry:

| John | Doe | Jr. | John.doe@email.com |
| Adam | Davis | | Adam.davis@email.com |
| Richard | Roe | II | Richard.roe@email.com |

In this example, an artificial neural network may generate a node for each data field in the data table (for example, "John," "Doe," "Jr.," "John.doe@email.com"). Through the interconnected nodes and their associated mathematical functions, the artificial neural network may output one or more data classifiers that indicates a classification of each row and/or column of the data table. For example, the artificial neural network may generate a data classifier (which may, for example, in the form of a text string) for the data table. In some examples, the data classifier may indicate that data fields associated with the first column are first names, data fields associated with the second column are last names, data fields associated with the third column are name suffixes, and/or data fields associated with the fourth column are email addresses.

In some examples, the processing circuitry may implement a decision tree algorithm to determine the first data classifier. An example decision tree may comprise one or more leaves, and each leaf may represent, for example, a possible classification of data. Additionally, or alternatively, the decision tree may comprise one or more branches, which may represent, for example, a possible conjunction of classifications (i.e. leaves on the decision tree).

For example, the decision tree algorithm may determine one or more classifications of each column of a data table. Continuing from the above example data table, the processing circuitry may provide data fields associated with the first column as input to an example decision tree algorithm. The example decision tree algorithm may determine that these data fields represent names (e.g. the "name" classification as a top node in the decision tree), and may further determine whether they represent first names or last names (e.g. a "first name" sub-classification and a "last name" sub-classification as sub-nodes of the top node in the decision tree). Based on data fields associated with the first column, the decision tree algorithm may calculate a first probability that these data fields represent first name, and a second probability that these data fields represent last name. The decision tree algorithm may compare the first probability with the second probability, and may determine that the first probability is higher than the second probability. In this example, the decision tree algorithm may generate an output (which may indicate that the first column represents first names), and the processing circuitry may determine the data classifier based on the output from the decision tree algorithm.

In some examples, the processing circuitry may implement a supervised learning model to determine the first data classifier. In an example supervised learning model, an input received by the model may be mapped to an output based on example input-output pairs (e.g. training data). The example supervised learning model may analyze training data, and may infer one or more functions from the example input-output pairs. The example supervised learning model may utilize the inferred functions to generate one or more outputs. Example supervised learning models may include, but is not limited to, support vector machines.

Continuing from the above example data table, example name suffixes may be provided to an example supervised learning model as training data. For example, the processing circuitry may provide the following example name suffixes to the example supervised learning model: II, III, IV, Jr., Sr., MD, PhD. The supervised learning model may connect each example name suffix with a name suffix classification. When the supervised learning model receives a data field "Jr." from the example data table above, the supervised learning model may generate an output indicates that the data field is associated with a name suffix, and the processing circuitry may generate a data classifier based on the output.

While the above examples illustrate generating example data classifiers based on an artificial neural network, a decision tree algorithm, and/or a supervised learning model, it is noted that the scope of the present disclosure is not limited to these mechanisms only. In some examples, other machine learning models, IAs and/or AI tools may additionally or alternatively be utilized to determine the data classifier, including, but is not limited to, Bayesian networks, genetic algorithms, regression models, and/or Random Forest.

In some examples, the processing circuitry may determine the first data classifier based on metadata associated with the data objects, in addition to or in alternative of data fields of the data objects. For example, the processing circuitry may determine the first data classifier based at least in part on name metadata, column metadata, row metadata, correlation metadata, and/or domain metadata associated with the first plurality of data objects, example details of which are described in connection with at least FIG. 4, FIG. 5, and FIG. 6.

At block 307, a processing circuitry (for example, a processing circuitry of the data analytics system 105 described in connection with FIG. 1 and/or the processor 202 of the apparatus 200 described in connection with FIG. 2) may generate a mapping specification. In some examples, the mapping specification may be configured to convert the first plurality of data objects associated with the first database schema to a second plurality of data objects associated with a second database schema.

In some examples, the processing circuitry may receive a data mapping request from a client device (such as, but is not limited to, one of the client devices 101A-101N as shown in FIG. 1). The data mapping request may comprise a first database identifier associated with a first database schema, a second database identifier associated with a second database schema, and a request to convert data objects from a first database schema to a second database schema.

As described above, a database identifier may identify and/or locate a database schema associated with a database (such as, but is not limited to, the databases 113A-113N as shown in FIG. 1). Upon receiving the data mapping request, the processing circuitry may, for example, retrieve data objects associated with the first database schema and determine a data classifier, similar to those described above in connection with block 303 and block 305. In some examples, a data mapping request may be combined with a data classification request, such that a client device may transmit one electronic request to trigger the processing circuitry to generate a data classifier and a mapping specification.

In some examples, the processing circuitry may generate the mapping specification based at least in part on the first plurality of data objects (retrieved at block 303) and the first data classifier (determined at block 305). As described above, the term "mapping specification" may refer to a data object that may describe and/or specify the movement and/or transformation that may determine how data associated with one data model can be represented based on another data model.

Continuing from the example related to the following data table:

|         | (Column 1) | (Column 2) | (Column 3) | (Column 4)              |
|---------|------------|------------|------------|-------------------------|
| (Row 1) | John       | Doe        | Jr.        | John.doe@email.com      |
| (Row 2) | Adam       | Davis      |            | Adam.davis@email.com    |
| (Row 3) | Richard    | Roe        | II         | Richard.roe@email.com   |

An example data classifier generated at block 305 may indicate that data fields associated with Column 1 are first names, data fields associated with Column 2 are last names, data fields associated with Column 3 are name suffixes, and/or data fields associated with Column 4 are email addresses. As an example, a data mapping request received by the processing circuitry may indicate a request to convert data from the above source data table into a different type of data table and/or a data object based on a different database schema. For example, the data mapping request may comprise a request to transform the above source data table to a target data object that is in compliance with the common data model.

As described above, the processing circuitry may generate the mapping specification based at least in part on a data classifier (for example, the data classifier determined at block 305). Continuing from the above example, the data classifier may indicate that data fields associated with Column 4 of the source data table are email addresses. The processing circuitry may determine that the target data object (for example, a data table based on the common data model) may comprise data fields for email addresses. The processing circuitry may generate a rule statement in the mapping specification to transform Column 1 of the source data table into the corresponding data fields for email addresses in the target data object.

In some examples, the processing circuitry may generate one or more rule statements in the mapping specification to combine one or more data fields based on the data classifier. In the above example, the data classifier may indicate that Column 1, Column 2, and Column 3 are associated with names. Based on the data classifier, the processing circuitry may combine data fields of Column 1, Column 2, and Column 3 of each row, and may provide them to a corresponding data field for names in the target data table.

In some examples, the processing circuitry may generate one or more rule statements in the mapping specification to split or duplicate a data field into multiple data fields based on the data classifier. For example, if the data classifier indicates that a data field comprises a date in a YYYY-MM-DD format, and the processing circuitry determines that the target data table comprises separated columns for year, month, and date, the processing circuitry may generate one or more rule statements to split the data field to isolate the year value, the month value, and the day value.

While the above example may illustrate an example mapping specification associated with converting and transforming data fields between data tables, it is noted that the scope of the present disclosure is not limited to data tables. In some examples, the processing circuitry may generate mapping specification based on other type(s) of data objects.

For example, the plurality of data objects may comprise a text document, which may comprise one or more ASCII characters. As described above in connection with block 305, the processing circuitry may generate a first data classifier based on the text document. As an example, the processing circuitry may implement machine learning models to conduct natural language processing on the text document. Based on the result of natural language processing, the processing circuitry may generate a data classifier that may indicate a meaning of the text document.

As a non-limiting example, the data classifier may indicate that the text document may describe the battery level values of one or more devices. Based at least in part on the data classifier, the processing circuitry may generate a mapping specification that may be configured to convert the battery level values in the source text document to data fields in a target data object.

In some examples, the processing circuitry may implement machine learning models, IAs and/or AI tools to generate the mapping specification. For example, the processing circuitry may implement an artificial neural network to determine the most efficient mapping specification. In this example, the processing circuitry may generate nodes in the example artificial neural network based on the data operations as specified in the rule statements. The processing circuitry may then calculate a path in the example artificial neural network that may require the least operation to determine the most efficient mapping specification. In some examples, other machine learning models, IAs and/or AI tools may be utilized by the processing circuitry for generating the mapping specification.

At block 309, a processing circuitry (for example, a processing circuitry of the data analytics system 105 described in connection with FIG. 1 and/or the processor 202 of the apparatus 200 described in connection with FIG. 2) may generate a second plurality of data objects.

In some examples, the processing circuitry may generate the second plurality of data objects based at least in part on the first plurality of data objects and the mapping specification. For example, the processing circuitry may convert data fields in the source data object to data fields for the target data object based on the rule statements of the mapping specification.

Continuing from the above example source data table related to names and email addresses, the processing circuitry may convert the source data table into a target data table based on the rule statements in the mapping specification. As described above, the rule statements may be generated based on the data classifier. In this example, based on the rule statements, the processing circuitry may generate combine data fields associated with Column 1, Column 2, and Column 3 of each row (based on, for example, the row identifier) from the source data table, and fill the combined data fields to a plurality of first data fields of the target data object. Additionally, or alternatively, the processing circuitry may transform data fields from Column 4 of the source data table to a plurality of second data fields of the target data object.

While the above examples illustrate an example data table as an example data object, it is noted that the scope of the present disclosure is not limited to data tables. In some examples, the plurality of data objects may comprise logs, numeric strings, and/or the like.

The method 300 ends at block 311.

Figure 4:
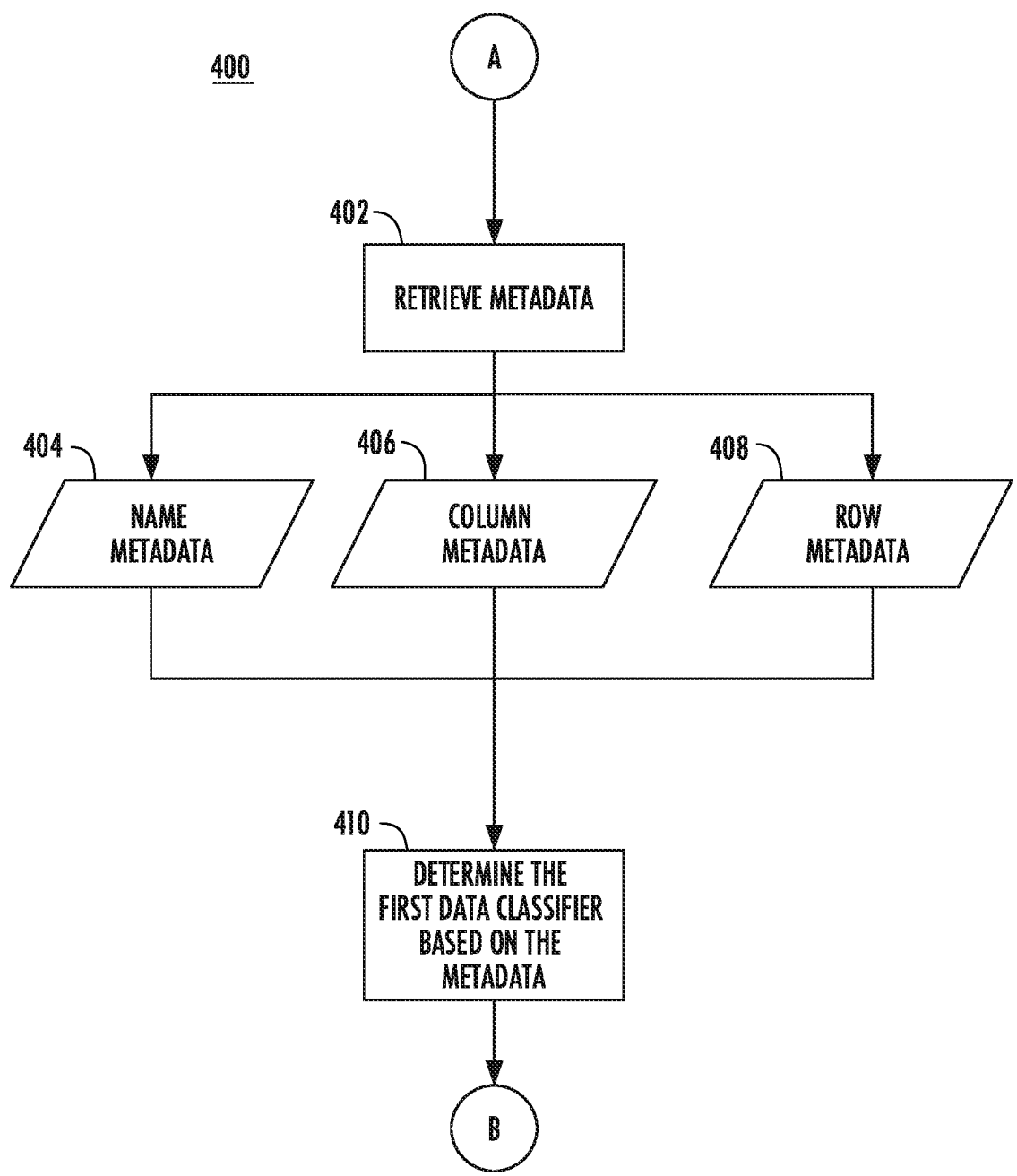
FIG. 4 illustrates an example flow diagram in accordance with various embodiments of the present disclosure.
Figure 5:
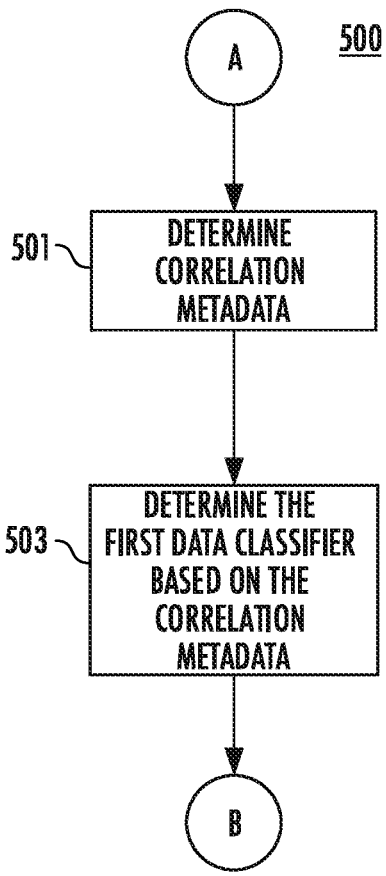
FIG. 5 illustrates an example flow diagram in accordance with various embodiments of the present disclosure.
Figure 6:
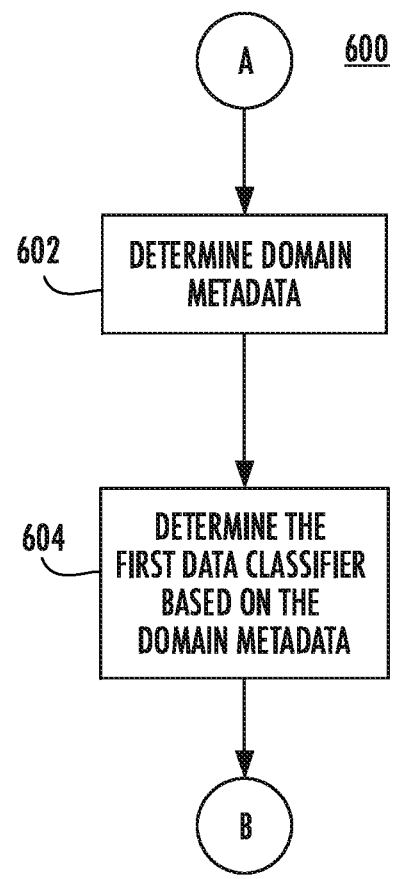
FIG. 6 illustrates an example flow diagram in accordance with various embodiments of the present disclosure.

Referring now to FIG. 4, FIG. 5, and FIG. 6, example methods in accordance with some embodiments of the present disclosure are illustrated. In particular, these example methods may illustrate example embodiments of determining a data classifier (which may be related to, for example, block 305 of FIG. 3 as described above).

Referring now to FIG. 4, an example method 400 in accordance with some embodiments of the present disclosure is illustrated. In particular, the example method 400 may illustrate example embodiments of determining a data classifier based at least on metadata associated with the data objects in a database.

In some examples, the method 400 may be performed by a processing circuitry (for example, a processing circuitry of the data analytics system 105 described in connection with FIG. 1 and/or the processor 202 of the apparatus 200 described in connection with FIG. 2).

The method 400 may start from block A. Referring back to FIG. 3, block A may be subsequent to retrieving a first plurality of data objects (block 303).

At block 402, a processing circuitry (for example, a processing circuitry of the data analytics system 105 described in connection with FIG. 1 and/or the processor 202 of the apparatus 200 described in connection with FIG. 2) may retrieve metadata associated with a plurality of data objects (for example, the first plurality of data objects described above in connection with FIG. 3).

In the example as shown in FIG. 4, the metadata retrieved by the processing circuitry may comprise at least one of name metadata 404, column metadata 406, or row metadata 408 associated with the first plurality of data objects. For example, the name metadata, the column metadata, and/or the row metadata may be associated with a data table.

In some examples, the name metadata 404 may be in the form of an ASCII text, a pointer, a memory address, and the like, and may comprise a name of a data object (such as a data table). For example, the name metadata 404 may indicate that a data table is associated with consumer information.

In some examples, the column metadata 406 may be in the form of an ASCII text, a pointer, a memory address, and the like, and may comprise a column identifier and/or a name of the column. For example, the column metadata 406 may indicate that data fields associated with a column are related to names of consumers.

In some examples, the row metadata 408 may be in the form of an ASCII text, a pointer, a memory address, and the like, and may comprise a row identifier and/or a name of the row. For example, the row metadata 408 may indicate that data fields associated with a row are related to a consumer identifier.

At block 410, a processing circuitry (for example, a processing circuitry of the data analytics system 105 described in connection with FIG. 1 and/or the processor 202 of the apparatus 200 described in connection with FIG. 2) may determine the first data classifier based on the metadata. For example, the processing circuitry may determine the first data classifier based at least on at least one of the name metadata 404, the column metadata 406, and/or the row metadata 408.

As described above, the processing circuitry may apply machine learning models, IAs and/or AI tools to determine the data classifier. In some examples, metadata retrieved at block 402 may be provided as input data to the machine learning models, IAs and/or AI tools. For example, the name metadata 404 may indicate that a data table is associated with consumer information, the column metadata 406 may indicate that data fields associated with a column are related to names of consumers, and/or the row metadata 408 may indicate that data fields associated with a row are related to a consumer identifier. The processing circuitry may implement the machine learning models, IAs and/or AI tools to determine the first data classifier based at least on at least one of the name metadata 404, the column metadata 406, and/or the row metadata 408, similar to those described above in connection with FIG. 4.

Subsequent to block 410, the method 400 may return to block B. As shown in FIG. 3, block B may be prior to generating a mapping specification at block 307. In some examples, the processing circuitry may generate the mapping specification based at least in part on the data classifier as described in connection with FIG. 4.

Referring now to FIG. 5, an example method 500 in accordance with some embodiments of the present disclosure is illustrated. In particular, the example method 500 may illustrate example embodiments of determining a data classifier based at least on correlation metadata associated with data objects in a database.

In some examples, the method 500 may be performed by a processing circuitry (for example, a processing circuitry of the data analytics system 105 described in connection with FIG. 1 and/or the processor 202 of the apparatus 200 described in connection with FIG. 2).

The method 500 may start from block A. Referring back to FIG. 3, block A may be subsequent to retrieving a first plurality of data objects (block 303).

At block 501, a processing circuitry (for example, a processing circuitry of the data analytics system 105 described in connection with FIG. 1 and/or the processor 202 of the apparatus 200 described in connection with FIG. 2) may determine correlation metadata. In some examples, the correlation metadata may be in the form of an ASCII text, a pointer, a memory address, and the like, and may indicate a relationship between two or more data objects.

In some examples, the correlation metadata may indicate a relationship between a first data table and a second data table. For example, the correlation metadata may indicate that both the first data table and the second data table are associated with consumer information. Additionally, or alternatively, the correlation metadata may indicate that the first data table may comprise data fields associated with consumer names, and the second data table may comprise data fields associated with consumer email addresses.

In some examples, the processing circuitry may implement machine learning models, IAs and/or AI tools to determine the correlation data. For example, the processing circuitry may implement supervised learning models to determine relationships between a first data table and a second data table.

At block 503, a processing circuitry (for example, a processing circuitry of the data analytics system 105 described in connection with FIG. 1 and/or the processor 202 of the apparatus 200 described in connection with FIG. 2) may determine the first data classifier based on the correlation metadata.

As described above, the processing circuitry may apply machine learning models, IAs and/or AI tools to determine the data classifier. In some examples, the correlation metadata determined at block 501 may be provided as input data by the processing circuitry to the machine learning models, IAs and/or AI tools. The processing circuitry may implement the machine learning models, IAs and/or AI tools to determine the first data classifier based at least in part on the correlation metadata, similar to those described above in connection with FIG. 4.

Subsequent to block 503, the method 500 may return to block B. As shown in FIG. 3, block B may be prior to generating a mapping specification at block 307. In some examples, the processing circuitry may generate the mapping specification based at least in part on the data classifier as described in connection with FIG. 5.

Referring now to FIG. 6, an example method 600 in accordance with some embodiments of the present disclosure is illustrated. In particular, the example method 600 may illustrate example embodiments of determining a data classifier based at least on domain metadata.

In some examples, the method 600 may be performed by a processing circuitry (for example, a processing circuitry of the data analytics system 105 described in connection with FIG. 1 and/or the processor 202 of the apparatus 200 described in connection with FIG. 2).

The method 600 may start from block A. Referring back to FIG. 3, block A may be subsequent to retrieving a first plurality of data objects (block 303).

At block 602, a processing circuitry (for example, a processing circuitry of the data analytics system 105 described in connection with FIG. 1 and/or the processor 202 of the apparatus 200 described in connection with FIG. 2) may determine domain metadata. In some examples, the correlation metadata may be in the form of an ASCII text, a pointer, a memory address, and the like, and may indicate a subject matter domain associated with a data object (such as, but is not limited to, a first data table).

The term "domain" or "subject matter domain" may refer to a set of common attributes and/or functionality among a plurality of data objects. In some examples, data objects associated with the same domain may represent sphere of knowledge or activity associated with common entities. For example, data objects that represent names, email addresses, and phone numbers may be grouped into a domain of consumer information.

In some examples, the processing circuitry may implement machine learning models, IAs and/or AI tools to determine the domain data. For example, the processing circuitry may implement artificial neural networks to determine a corresponding domain associated with a first data table.

At block 604, a processing circuitry (for example, a processing circuitry of the data analytics system 105 described in connection with FIG. 1 and/or the processor 202 of the apparatus 200 described in connection with FIG. 2) may determine the first data classifier based on the domain metadata.

As described above, the processing circuitry may apply machine learning models, IAs and/or AI tools to determine the data classifier. In some examples, the domain metadata determined at block 602 may be provided as input data by the processing circuitry to the machine learning models, IAs and/or AI tools. The processing circuitry may implement the machine learning models, IAs and/or AI tools to determine the first data classifier based at least in part on the domain metadata, similar to those described above in connection with FIG. 4.

Subsequent to block 604, the method 600 may return to block B. As shown in FIG. 3, block B may be prior to generating a mapping specification at block 307. In some examples, the processing circuitry may generate the mapping specification based at least in part on the data classifier as described in connection with FIG. 6.

While FIG. 4, FIG. 5, and FIG. 6 illustrate example methods of determining a data classifier based on the name metadata, the column metadata, the row metadata, the correlation metadata, and/or the domain metadata, it is noted that the scope of the present disclosure is not limited to these metadata. In some examples, other metadata may be used to determine the data classifier in addition to or in alternative of these metadata described above.

Figure 7:
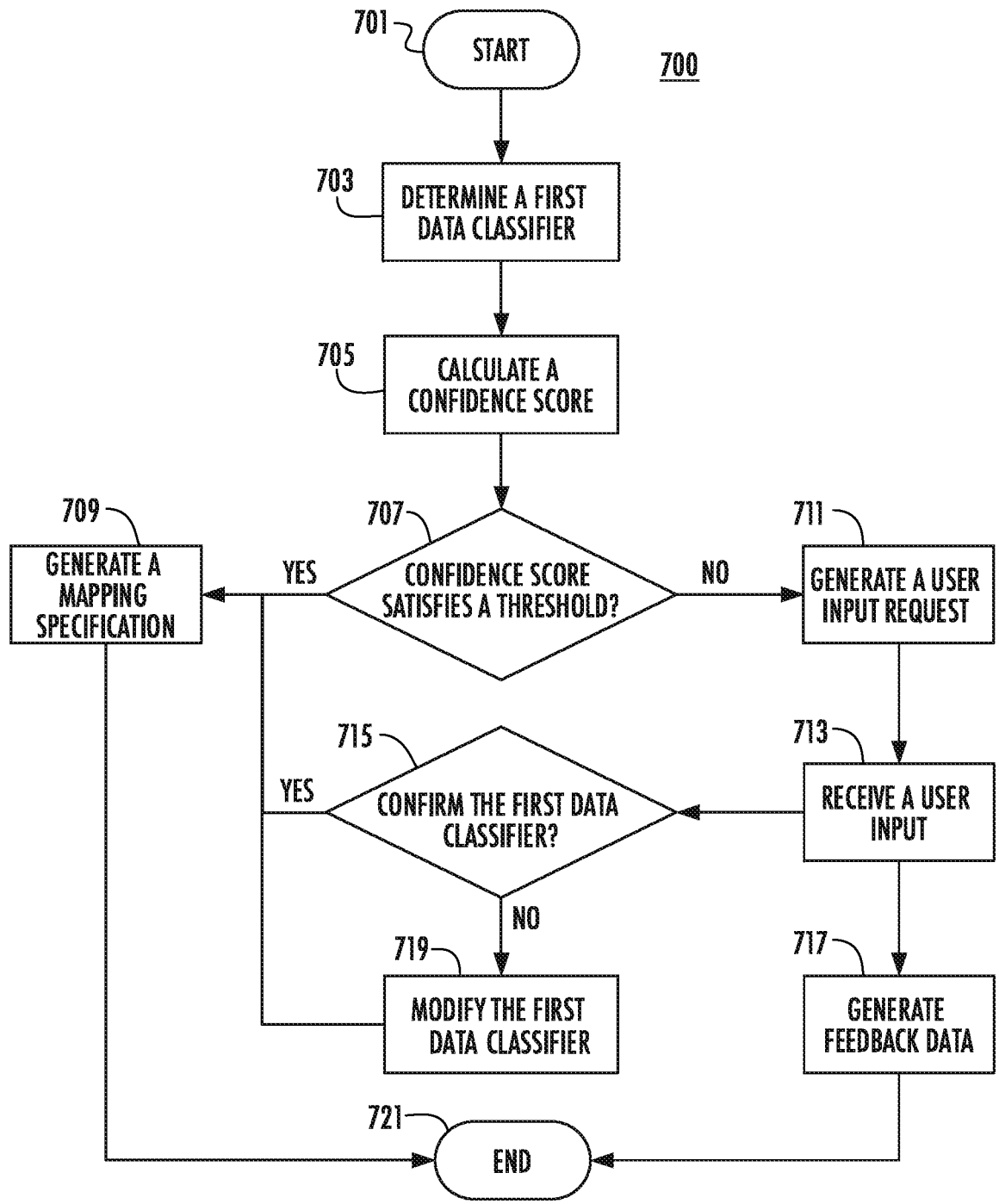
FIG. 7 illustrates an example flow diagram in accordance with various embodiments of the present disclosure.

Referring now to FIG. 7, an example method 700 in accordance with some embodiments of the present disclosure is illustrated. In particular, the example method 700 may illustrate example embodiments of classifying data objects and generating mapping specification for converting data objects. In some examples, the method 700 may be performed by a processing circuitry (for example, a processing circuitry of the data analytics system 105 described in connection with FIG. 1 and/or the processor 202 of the apparatus 200 described in connection with FIG. 2).

The method 700 starts at block 701.

At block 703, a processing circuitry (for example, a processing circuitry of the data analytics system 105 described in connection with FIG. 1 and/or the processor 202 of the apparatus 200 described in connection with FIG. 2) may determine a first data classifier.

In some examples, the first data classifier may be associated with a first plurality of data objects. In some examples, the processing circuitry may generate the first data classifier based on methods similar to those described in connection with FIG. 3, FIG. 4, FIG. 5, and/or FIG. 6.

At block 705, a processing circuitry (for example, a processing circuitry of the data analytics system 105 described in connection with FIG. 1 and/or the processor 202 of the apparatus 200 described in connection with FIG. 2) may calculate a confidence score associated with the first data classifier.

A "confidence score" may refer to a mathematical value that may indicate the likelihood that the corresponding data is correct and/or represent the true state. For example, a confidence score associated with a data classifier may indicate the likelihood that the data classifier comprises a correct classification and/or a correct description of the data object(s).

As described above in connection with FIG. 3, FIG. 4, FIG. 5, and FIG. 6, the processing circuitry may determine the first classifier based on, for example, machine learning models, IAs and/or AI tools. In some examples, the processing circuitry may generate the confidence score using the same or different machine learning models, IAs and/or AI tools as the one(s) used for determining the data classifier.

As an example, when the processing circuitry utilizes a supervised learning model to determine the first data classifier, the processing circuitry may compare the data fields of data objects with the input-output pairs in the training data. The processing circuitry may calculate a proximity value that may indicate the level of similarity between the data fields and the training data. The higher the similarity, the more likely that the supervised learning model may generate a correct classification for the data objects. As such, the processing circuitry may generate a confidence score based on the proximity value.

Additionally, or alternatively, the processing circuitry may utilize other machine learning models, IAs and/or AI tools to calculate the confidence score.

At block 707, a processing circuitry (for example, a processing circuitry of the data analytics system 105 described in connection with FIG. 1 and/or the processor 202 of the apparatus 200 described in connection with FIG. 2) may determine whether the confidence score satisfies a predetermined threshold.

In some examples, the processing circuitry may determine the predetermined threshold based on, for example, a system requirement. For example, an example system requirement may indicate the level of precision required for data mapping. In this example, the higher the level of precision required, the higher the value for the predetermined threshold.

In some examples, the predetermined threshold may be set by a user. For example, a user (while operating a client device) may provide a user input to the processing circuitry. The user input may comprise a value that may correspond to the predetermined threshold.

Referring back to FIG. 7, if the processing circuitry determines that the confidence score satisfies the predetermined threshold at block 707, the method 700 may proceed to block 709.

As an example, if the confidence score calculated at block 705 is 0.8, and the predetermined threshold value is 0.6, the processing circuitry may determine that the confidence score is higher than the threshold value, and therefore the confidence score satisfies the predetermined threshold.

At block 709, a processing circuitry (for example, a processing circuitry of the data analytics system 105 described in connection with FIG. 1 and/or the processor 202 of the apparatus 200 described in connection with FIG. 2) may generate a mapping specification in response to determining that the confidence score satisfies the predetermined threshold.

In some examples, the processing circuitry may generate a mapping specification based at least in part on the first data classifier, similar to those described above in connection with FIG.

Referring back to FIG. 7, if the processing circuitry determines that the confidence score does not satisfy the threshold at block 707, the method 700 may proceed to block 711.

As an example, if the confidence score calculated at block 705 is 0.7, and the predetermined threshold value is 0.9, the processing circuitry may determine that the confidence score is lower than the threshold value, and therefore the confidence score does not satisfy the predetermined threshold.

At block 711, a processing circuitry (for example, a processing circuitry of the data analytics system 105 described in connection with FIG. 1 and/or the processor 202 of the apparatus 200 described in connection with FIG. 2) may generate a user input request, and may transmit the user input request to a client device (such as client devices 101A-101N described above in connection with FIG. 1).

In some examples, the user input request may be associated with the first data classifier. For example, the user input request may comprise an electronic request to confirm whether the first data classifier is correct.

In some examples, the user input request may be transmitted to a client device associated with an expert. The client device may render the user input request for display, which may include a sample of the data objects and the data classifier determined at block 703. As an example, the client device may display a data table and a data classifier indicating that the data table is determined to be associated with consumer information. The expert may choose whether the classification is correct or incorrect.

At block 713, a processing circuitry (for example, a processing circuitry of the data analytics system 105 described in connection with FIG. 1 and/or the processor 202 of the apparatus 200 described in connection with FIG. 2) may receive a user input. The user input may be in response to the user input request at block 711.

In some examples, the user input may comprise an indication from the user on whether the data classifier determined at block 703 is correct. As an example, the user input may comprise a confirmation of the data classifier, which may indicate that, for example, the expert confirms that the data classifier represents a correct classification of the data objects. As another example, the user input may comprise a modification of the data classifier, which may indicate that, for example, the expert determines the data classifier determined at block 703 is incorrect or inaccurate.

At block 715, a processing circuitry (for example, a processing circuitry of the data analytics system 105 described in connection with FIG. 1 and/or the processor 202 of the apparatus 200 described in connection with FIG. 2) may determine whether the user input received at block 713 indicates that the first data classifier determined at block 703 is correct.

If, at block 715, the processing circuitry determines that the user input confirms that the data classifier is correct, the method 700 may proceed to block 709. For example, if the user input comprises a confirmation of the first data classifier, the processing circuitry may generate the mapping specification in response to the confirmation of the first data classifier at block 709.

If, at block 715, the processing circuitry determines that the user input does not confirm that the data classifier is correct, the method 700 may proceed to block 719. At block 719, a processing circuitry (for example, a processing circuitry of the data analytics system 105 described in connection with FIG. 1 and/or the processor 202 of the apparatus 200 described in connection with FIG. 2) may modify the first data classifier based on the user input.

In some examples, the user input may comprise a modification of the first data classifier. As an example, if the first data classifier determined at block 703 indicates a data object is determined to be associated with "first names," a user input may indicate that the data object is associated with "last names."

In some examples, the processing circuitry may modify the first data classifier based on the user input. Continuing from the above example, the processing circuitry may change the data classifier from indicating "first names" to indicating "last names" based on the user input.

Subsequent to modifying the first data classifier at block 719, the processing circuitry may proceed to block 709. At block 709, the processing circuitry may generate a mapping specification based on the modified first data classifier.

Referring back to FIG. 7, at block 717, a processing circuitry (for example, a processing circuitry of the data analytics system 105 described in connection with FIG. 1 and/or the processor 202 of the apparatus 200 described in connection with FIG. 2) may generate feedback data based on the user input.

In some examples, the feedback data may be provided to the machine learning models, IAs and/or AI tools for improving the accuracy in generating a data classifier. For example, the processing circuitry may retrieve another plurality of data objects associated with the same or a different database schema (as compared to that of the first plurality of data objects), and may generate a data classifier based on data objects and the feedback data.

As an example, when the processing circuitry utilizes a supervised learning model to determine the first data classifier, the processing circuitry may generate feedback data in the form of input-output pairs (i.e. training data for the supervised learning model) based on the user input. For example, when the user input indicates that a data object is associated with last names, the processing circuitry may generate a pair of input (the data object) and output (a last name classification). The processing circuitry may provide the pair of input and output to train the supervised learning model, so that the supervised learning model may improve the accuracy in determining the data classifier for other data objects similar to those in the input-output pairs.

The method 700 ends at block 721.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, wherein the at least one non-transitory memory and the program code are configured to, with the at least one processor, cause the apparatus to at least:
retrieve a first plurality of data objects associated with a first database schema from a database;
determine, based at least on the first plurality of data objects, a first data classifier corresponding to the first database schema using a first machine learning model configured based at least in part on correlation metadata indicating a relationship between at least the first database schema from the database and at least one other database schema;
generate a mapping specification based at least in part on the first data classifier and the first plurality of data objects, wherein the mapping specification comprises one or more rule statements that specifies a movement and/or transformation to determine representation of a second plurality of data objects associated with a second database schema based on the first plurality of data objects associated with the first database schema, wherein the mapping specification is configured to convert the first plurality of data objects associated with the first database schema to the second plurality of data objects associated with the second database schema, wherein the mapping specification is configured to split a combined data portion of the first database schema into a plurality of portions of the second database schema; and
generate the second plurality of data objects based at least in part on the first plurality of data objects and the mapping specification.

2. The apparatus of claim 1, wherein the first plurality of data objects comprise a first data table, wherein the first data table comprises at least one data field.

3. The apparatus of claim 2, wherein the first data table comprises at least one of name metadata, column metadata, or row metadata.

4. The apparatus of claim 3, wherein, when determining the first data classifier corresponding to the first database schema, the at least one non-transitory memory and the program code are configured to, with the at least one processor, cause the apparatus to:
retrieve at least one of the name metadata, the column metadata, or the row metadata associated with the first plurality of data objects; and
determine the first data classifier based further on at least one of the name metadata, the column metadata, or the row metadata.

5. The apparatus of claim 2, wherein the first plurality of data objects comprise a second data table, wherein the at least one non-transitory memory and the program code are configured to, with the at least one processor, cause the apparatus to:
determine correlation metadata associated with the first data table and the second data table; and
determine the first data classifier based further on the correlation metadata.

6. The apparatus of claim 2, wherein, when determining the first data classifier corresponding to the first database schema, the at least one non-transitory memory and the program code are configured to, with the at least one processor, cause the apparatus to:
determine domain metadata associated with the first data table; and
determine the first data classifier based further on the domain metadata.

7. The apparatus of claim 1, wherein, prior to generating the mapping specification, the at least one non-transitory memory and the program code are configured to, with the at least one processor, cause the apparatus to further:
calculate a confidence score associated with the first data classifier; and
determine whether the confidence score satisfies a predetermined threshold.

8. The apparatus of claim 1, the apparatus further caused to:
calculate a confidence score associated with the first data classifier;
generate feedback data from an expert user indicating whether the first data classifier is accurate for the first plurality of data objects, wherein the expert user differs from an end user associated with the mapping specification; and
update training of the first machine learning model based at least in part on the feedback data.

9. The apparatus of claim 8, wherein the confidence score comprises a proximity value between at least one data field of the first plurality of data objects and training data associated with a supervised learning model.

10. The apparatus of claim 1, wherein the correlation metadata comprises domain metadata, wherein the first machine learning model is configured based at least in part on the domain metadata.

11. The apparatus of claim 1, wherein the first data classifier is determined based at least in part on resulting data generated by processing a particular data object utilizing at least one natural language processing model.

12. The apparatus of claim 1, wherein the first machine learning model comprises a decision tree that includes at least one leaf corresponding to the first data classifier and at least one other leaf corresponding to a second possible data classifier.

13. A computer-implemented method, comprising:
retrieving a first plurality of data objects associated with a first database schema from a database;
determining, based at least on the first plurality of data objects, a first data classifier corresponding to the first database schema using a first machine learning model configured based at least in part on correlation metadata indicating a relationship between at least the first database schema from the database and at least one other database schema;
generating a mapping specification based at least in part on the first data classifier and the first plurality of data objects, wherein the mapping specification comprises one or more rule statements that specifies a movement and/or transformation to determine representation of a second plurality of data objects associated with a second database schema based on the first plurality of data objects associated with the first database schema, wherein the mapping specification is configured to convert the first plurality of data objects associated with the first database schema to the second plurality of data objects associated with the second database schema, wherein the mapping specification is configured to split a combined data portion of the first database schema into a plurality of portions of the second database schema; and
generating the second plurality of data objects based at least in part on the first plurality of data objects and the mapping specification.

14. The computer-implemented method of claim 13, wherein the first plurality of data objects comprise a first data table, wherein the first data table comprises at least one data field.

15. The computer-implemented method of claim 14, wherein the first data table comprises at least one of name metadata, column metadata, or row metadata.

16. The computer-implemented method of claim 15, wherein determining the first data classifier corresponding to the first database schema further comprises:
retrieving at least one of the name metadata, the column metadata, or the row metadata associated with the first plurality of data objects; and
determining the first data classifier based further on at least one of the name metadata, the column metadata, or the row metadata.

17. The computer-implemented method of claim 14, wherein the first plurality of data objects comprise a second data table, wherein the computer-implemented method further comprises:
determining correlation metadata associated with the first data table and the second data table; and
determining the first data classifier based further on the correlation metadata.

18. The computer-implemented method of claim 14, further comprising:
determining domain metadata associated with the first data table; and
determining the first data classifier based further on the domain metadata.

19. The computer-implemented method of claim 13, further comprising:
calculating a confidence score associated with the first data classifier; and
determining whether the confidence score satisfies a predetermined threshold.

20. A computer program product comprising at least one non-transitory computer-readable storage medium having computer-readable program code portions stored therein, the computer-readable program code portions comprising an executable portion configured to:
retrieve a first plurality of data objects associated with a first database schema from a database,
determine, based at least on the first plurality of data objects, a first data classifier corresponding to the first database schema using a first machine learning model configured based at least in part on correlation metadata indicating a relationship between at least the first database schema from the database and at least one other database schema;
generate a mapping specification based at least in part on the first data classifier and the first plurality of data objects, wherein the mapping specification comprises one or more rule statements that specifies a movement and/or transformation to determine representation of a second plurality of data objects associated with a second database schema based on the first plurality of data objects associated with the first database schema, wherein the mapping specification is configured to convert the first plurality of data objects associated with the first database schema to the second plurality of data objects associated with the second database schema, wherein the mapping specification is configured to split a combined data portion of the first database schema into a plurality of portions of the second database schema; and
generate the second plurality of data objects based at least in part on the first plurality of data objects and the mapping specification.

* * * * *